(12) United States Patent
Huang

(10) Patent No.: US 6,354,598 B1
(45) Date of Patent: Mar. 12, 2002

(54) OIL SEAL INCLUDING WEAR SLEEVE WITH HYDRODYNAMIC PATTERN

(75) Inventor: Kuang-Yu Huang, Geneva, IL (US)

(73) Assignee: SKF USA Inc., Elgin, IL (US)

( * ) Notice: Subject to any disclaimer, the term of this patent is extended or adjusted under 35 U.S.C. 154(b) by 0 days.

(21) Appl. No.: 09/504,982

(22) Filed: Feb. 15, 2000

(51) Int. Cl.[7] .................................................. F16J 15/32
(52) U.S. Cl. ........................ 277/551; 277/571; 277/572
(58) Field of Search ................................ 277/551, 559, 277/571, 572

(56) References Cited

U.S. PATENT DOCUMENTS

| | | |
|---|---|---|
| 2,860,896 A | 11/1958 | Naumann |
| 3,259,393 A | 7/1966 | Dega |
| 3,515,395 A | 6/1970 | Weinand |
| 3,554,561 A | 1/1971 | Weinand |
| 3,939,551 A * | 2/1976 | Clark ........................... 29/417 |
| 4,501,431 A | 2/1985 | Peisker et al. |
| 4,643,436 A * | 2/1987 | Jackowski |
| 4,906,009 A | 3/1990 | Saitoh |
| 5,346,662 A * | 9/1994 | Black et al. ................. 264/138 |
| 5,350,181 A * | 9/1994 | Horve |
| 5,354,071 A * | 10/1994 | McClure |
| 6,044,557 A * | 4/2000 | Smith et al. ................ 29/897.2 |
| 6,170,833 B1 * | 1/2001 | Cox et al. .................... 277/551 |
| 6,170,834 B1 * | 1/2001 | Vogt ............................ 277/559 |
| 6,182,975 B1 * | 2/2001 | Matsushima et al. ....... 277/559 |
| 6,209,883 B1 * | 4/2001 | Kashmerick et al. ....... 277/593 |
| 6,220,600 B1 * | 4/2001 | Tripathy et al. ............ 277/309 |

FOREIGN PATENT DOCUMENTS

WO    WO 94/29622    * 12/1994

* cited by examiner

Primary Examiner—Anthony Knight
Assistant Examiner—Alison K. Pickard
(74) Attorney, Agent, or Firm—James T. FitzGibbon; Vedder Price Kaufman & Kammholz

(57) ABSTRACT

A wear sleeve for use with the active face of an associated seal unit. The wear sleeve includes a radial flange and an axial flange having a plurality of grooves therein. The grooves are formed on an inner margin of the blank while the blank is in a flat condition. Thereafter, the axial flange is drawn in a skirt forming die so as to create an outer surface on the axial flange having a hydrodynamic pattern thereon. The grooves are formed in a sinusoidal pattern, and the inner surface of the skirt forming die is free from formations creating interference with the skirt.

25 Claims, 2 Drawing Sheets

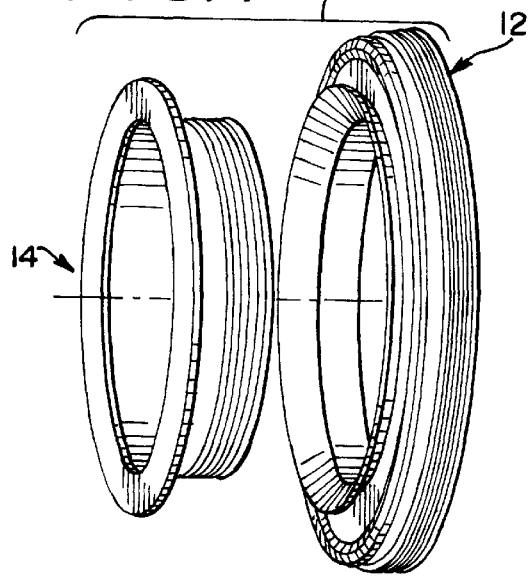
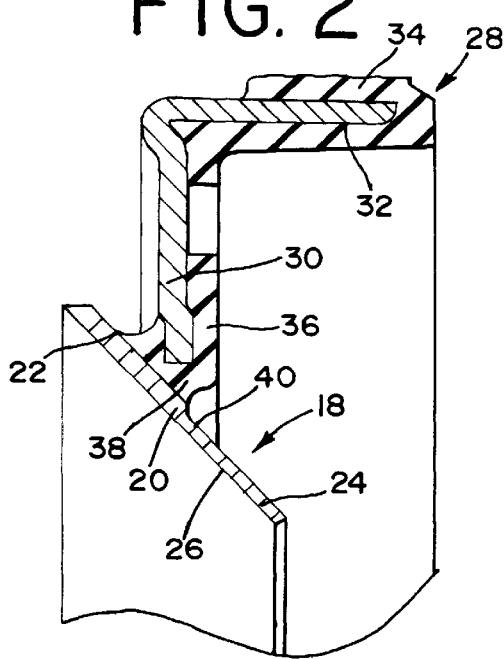
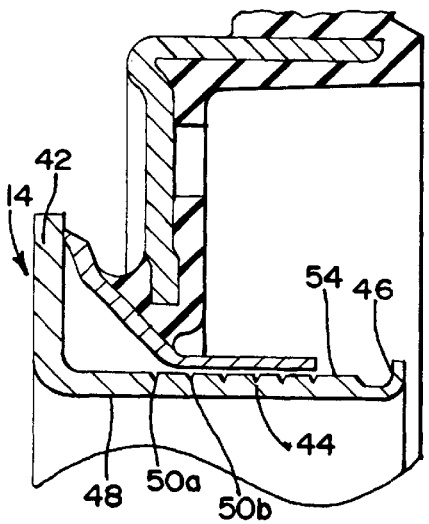
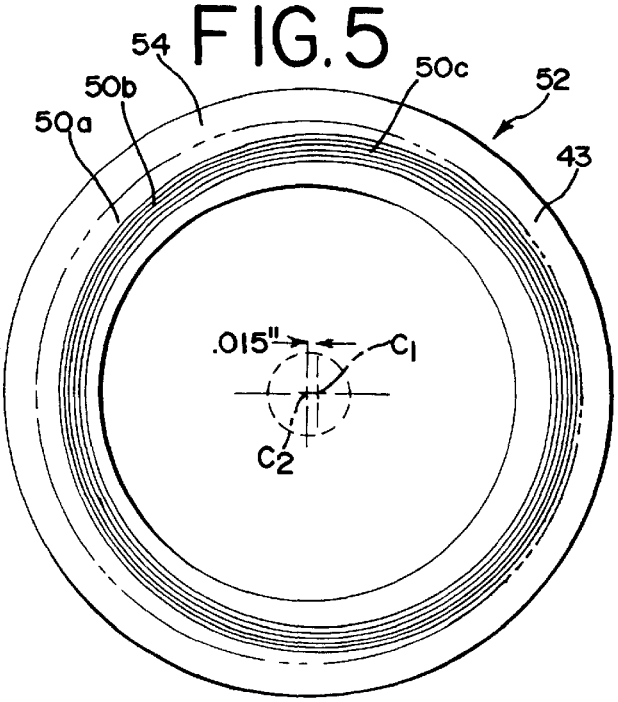
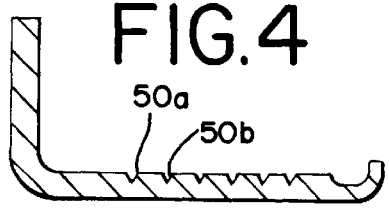

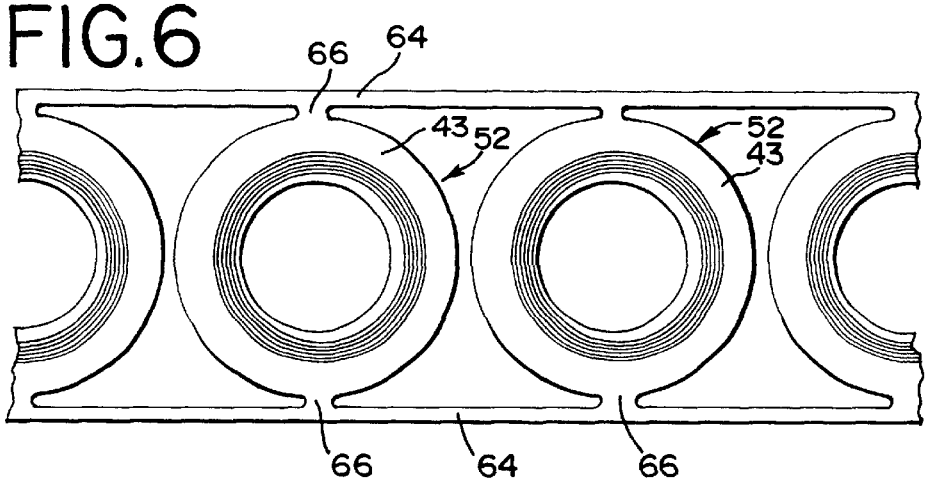
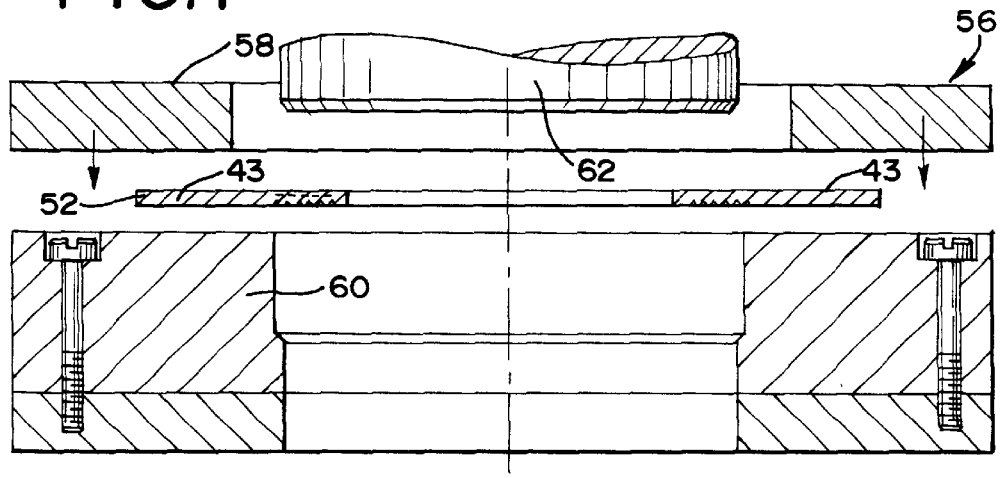
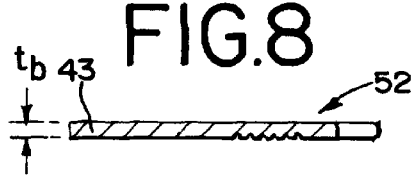
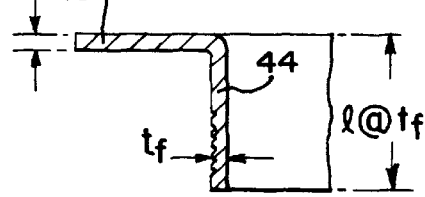 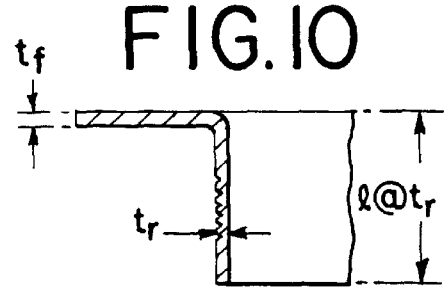

OIL SEAL INCLUDING WEAR SLEEVE WITH HYDRODYNAMIC PATTERN

BACKGROUND OF THE INVENTION

The present invention relates generally to oil seals, and more particularly, to seals with associated wear sleeves and on which the wear sleeves possess a hydrodynamic pattern. In connection with the oil seal itself, the grooves or formations on wear sleeve work to pump slightly leaking oil from the "air" side under the seal to the "oil" side of the seal.

With automobile and truck manufacturers being forced by general improvements in the products and by competition to extend longer and longer warranties, the oil seal remains a problem of concern to the auto industry. Not only must the seal be responsible for its own performance, but owing to the inaccessible location of most oil seals, the labor involved in replacing worn out or faulty seals is many times in excess of the cost attributable to the oil seal itself. As the result of this consideration, among others, there has been an increasing emphasis on the use of PTFE (polytetrafluoroethylene) or like materials as the primary lip in oil seals. In particular, many very high-mileage applications such as trucks and tractors used with semi-trailers, pose particular problems.

The PTFE or "Teflon" type materials are commonly filled with graphite, fiberglass, and other components known to those skilled in the art. However, in an attempt to manufacture oil seals which are hydrodynamic in character and which also include "Teflon" components, there have arisen several problems, particularly with hydrodynamic seals. The resinous "Teflon" lips contain hydrodynamic formations which tend to wear long before the seals.

The first approach which was tried to alleviate this problem was to impress a hydrodynamic pattern on the shaft or the like. However, this created several problems of expense which really cannot readily be overcome. Hence, the idea of grooving or notching a shaft involves complex machine operations which must be performed "in the round", that is, impressed on the shaft after the same is manufactured. Besides machining, this also calls for heat treating or other surface treating, also "in the round."

Now, because of the desire of automotive and other manufacturers to look to only one supplier as a source for oil seals, it is common for a seal which is sold for a certain application also to include the parts required to make the complete seal, i.e., one supplier now makes both wearing surfaces. Hence, the ordinary seal of this type includes what is known as a wear sleeve as well as the seal itself. The seal is normally made from rubber, but in many cases is made from Teflon or the like, or at least includes a Teflon wear surface.

At least one proposal has been made to form the hydrodynamic pattern on the axial flange of the wear sleeve. Accordingly, in Horve Patent No. 5,350,181, a portion of the sleeve was shown as being drawn and at the same time, being forced into an embossed pattern on the drawing die. As a consequence, as shown in that patent, a pattern of angled ribs could be formed on the wear sleeve. However, this process involved many of the same problems in respect to the die as would otherwise occur with the shaft, namely, cutting or forming hydrodynamic ribs in the die, which ribs would then require hardening so the die could be used many times.

Thus, impressing a hydrodynamic pattern in the die over which the axial flange of the wear sleeve was formed involved a somewhat laborious case of cutting all but the ribs into the die or otherwise forming the pattern on the drawing die. Such a pattern was required to be formed in the ring which was then used in the drawing process. Accordingly, the die required surface hardening thereafter. Such a process was, particularly for flanges of varying sizes, unduly expensive. However, such a seal held out the promise of placing the hydrodynamic pattern on the metal wear sleeve rather than on the PTFE lip, and in this sense was considered advantageous if somewhat impractical.

Hence, it would be advantageous to provide an improved form of hydrodynamic seal, particularly one that is effective with PTFE or the like seals.

It is an object of the present invention is to provide a two-piece seal having a seal member and a wear sleeve member, with the wear sleeve including a formation, preferably a bidirectional pattern, that is coined or stamped therein, and made by a novel process.

Another object of the present invention is to perform a stamping or coining operation on the wear sleeve blank and thereafter, forming the wear sleeve to its finished dimension.

Yet another object of the invention is to provide a wear sleeve having a stamped or coined pattern therein consisting of several circular grooves, whose center is slightly offset with respect to the center of the wear sleeve blank, whereby, when the wear sleeve is drawn so as to include an axial flange, the depressions or the like form a bidirectional pumping pattern in the wear sleeve.

Still another object of the invention is to provide such a wear sleeve with a stamped or coined portion therein, which is subsequently elongated into an axial flange, all without loss of effectiveness.

In this method, a much more economical and satisfactory way of creating a wear sleeve that has a hydrodynamic pattern impressed therein has been discovered.

SUMMARY OF THE INVENTION

In this method, a simple series of concentric circular grooves, slightly offset to create a pumping pattern, are formed in the wear sleeve blank of the seal assembly while the wear sleeve blank is in a flat condition. Thereafter, the flat blank used in forming the wear sleeve is drawn so that, in addition to the ordinary installing curl, an axial flange is formed in the wear sleeve which carries the same hydrodynamic pattern that was stamped or coined in the wear sleeve blank while it was in a flat condition. The method of making the wear sleeve thus includes merely stamping or coining a grooved pattern in the flat sleeve, whereupon the sleeve may be drawn and the axial flange thereof will undergo a somewhat reduced thickness and elongated form.

Thus, although the length of the axial flange may be somewhat elongated, as for example up to 30% longer than the original portion selected for drawing, the depth and configuration of the grooves which afford the hydrodynamic action are relatively unchanged. In some cases, where the depth of the groove is reduced significantly, it may be accommodated merely by stamping or coining the pattern to a greater depth in the blank before the blank is drawn.

Accordingly, it is possible to manufacture an oil seal having the advantages of an axial wear sleeve hydrodynamic pattern including a bidirectional pattern, without the expense and difficulty formerly thought necessary to create such a product.

The manner in which these and other objects of the present invention are achieved in practice will become more clearly apparent when reference is made to the following detailed description of the invention and shown in the accompanying drawings wherein like reference numbers indicate corresponding parts throughout.

BRIEF DESCRIPTION OF THE DRAWINGS

FIG. 1 is a perspective view of a seal and wear sleeve made according to the invention and showing the pattern embossed on the wear sleeve;

FIG. 2 is a vertical sectional view of a sealing element as formed in a mold, and preferably including a frustoconical wear sleeve contact unit made from PTFE or other sealing material and bonded to a seal casing;

FIG. 3 is a view similar to FIG. 2 and showing the seal associated with a wear sleeve made according to the present invention;

FIG. 4 is a sectional view of the wear sleeve of the invention showing the grooves that are cut or coined therein, exaggerated for clarity;

FIG. 5 is a plan view of the wear sleeve blank of the present invention, showing the same to be stamped or coined with a bidirectional hydrodynamic pattern formed by offsetting the center of the groove pattern with respect to the center of the blank;

FIG. 6 is a view of a typical sheet of blanks made according to one form of the invention;

FIG. 7 is a diagrammatic view of the die used to impart the final form to the wear sleeve of the present invention;

FIG. 8 is a vertical sectional view showing how the blank is drawn with the stamped or coined pattern therein;

FIG. 9 shows how one leg of the wear sleeve is formed without drawing to a reduced width so as to include an axial flange; and, FIG. 10 shows the wear sleeve axial flange in its lengthened condition without loss of effectiveness of the coined or stamped pattern therein.

DESCRIPTION OF THE PREFERRED EMBODIMENTS OF THE INVENTION

While the present invention may be embodied in different forms and types of seal assemblies, a description of a presently preferred form of seal will be given. In these units, the seal assembly is a two-element unit, including a primary seal element and a wear sleeve element, and the hydrodynamic elements are formed in an axial flange portion of the outside facing surface of the wear sleeve skirt. In some cases, the primary seal may be of conventional elastomeric construction, but in the preferred case, the primary seal is made from a filled resinous band of polytetrafluoroethylene (PTFE). The hydrodynamic elements are preferably bidirectional, wherein the invention achieves its most advantageous form, but other forms are possible.

It is within the scope of the invention to have certain of the parts reversed in orientation, that is, to have the seal rotate and the wear sleeve remain fixed, and to have the wear sleeve on the outside and the seal element on the inside.

Referring now to FIG. 1, there is shown a seal assembly generally designated 10, and this assembly consists of a seal element generally designated 12, and a wear sleeve element generally designated 14. In this form of seal, the sealing element is made of a PTFE or Teflon material generally designated 18 and formed into a frustoconical ring 20. The ring 20 may initially also lie entirely in a radial plane, i.e., be flat if desired, and be subsequently formed into the appropriate shape.

The ring may include a thickened outer diameter portion 22 and a reduced thickness inside diameter portion 24 to ease flaring out. The seal portion 12 presents a working face 26 to the counterpart portion of a wear sleeve 14. The seal also includes a casing generally designated 28 having a bonding or radial flange 30 and an axial or installation flange 32. In keeping with the invention, the seal 12 preferably includes a rubber outside diameter portion 34, an inside web 36 of rubber, and a rubber collar portion 38 which is bonded to the reverse side 40 of the Teflon element 20, preferably near the center thereof. Other forms of attaching the resin member to the stamping are also satisfactory.

Referring to FIG. 3, the wear sleeve 14 is shown preferably to comprise a radial flange 42 and an axial flange 44, terminating in a curl portion 46. The wear sleeve 14 includes an installation or inner diameter surface 48 which will be pressed tightly over the outside diameter of a shaft (not shown) to be sealed. Conceivably, the installation surface 48 of the axial flange 44 could also be fitted with a thin band or portion of rubber (not shown) to facilitate installation. A very important feature of the invention lies in the hydrodynamic grooves 50a, 50b, etc. formed in the appropriate surface of the wear sleeve and the method of making them.

Referring now particularly to FIG. 5, there is shown a flat wear sleeve blank generally designated 52 before it is formed into the wear sleeve 14 by a process to be described herein. On this blank, there are a number of grooves 50a, 50b, 50c, etc., formed in a circle. Preferably, six such grooves are formed in the upwardly facing surface 54 of the wear sleeve. The stamping or coining die (not shown) contains a series of ribs and forms these grooves 50a, 50b, etc. by coining or stamping and by slightly offsetting their centers C1 of curvature from the center of curvature C2 of the flat blank 52. This results in the pattern as shown on the blank 52, namely, a circular pattern of grooves which is slightly off center with respect to the center of the blank.

The amount of offset of these grooves 50a, 50b, etc., is preferably 0.015 to one side of the center C2, thereby creating a total offset of 0.030" on diameters in the flat state. These grooves are spaced from each other a distance of about 0.04" to about 0.070", also measured on diameters. In one preferred embodiment, a distance of 0.058" was used. Thus, one diameter was 4.543", the next diameter was 4.601", the next diameter was 4.659", etc. Each of these grooves was then formed by stamping or coining to a depth of about 0.002 to about 0.005 of an inch, preferably, 0.004" in the example under consideration.

FIG. 7 shows the next step in the forming process. Here, a die set generally designated 56 is shown to comprise a hold down member 58, a drawing die 60 and a punch 62. The blank 52 with the coined-in grooves is then placed facing downward on the die, and the hold down 58 is moved so as to engage and secure the marginal portion 43 of the blank 52 between the hold down and the drawing die 60.

Referring now to FIGS. 8–10 as well as FIG. 7, the punch 62 then forms the axial flange 44 on the blank and elongates it somewhat, perhaps in this example on the order of 30%. The die set is shown for illustrative purposes only, and the drawing operation may comprise a number of steps utilizing a number of punches or it may be accomplished with a single punch. The exact form of the drawing die is not a part of the invention per se and its functioning is not particularly critical to the success of the invention.

Referring now to FIG. 8, the thickness $t_b$ of the blanks 52 is preferably 0.035" to 0.080", and, in this example, is 0.048". This is the same thickness as the flange $t_f$ before the flange is drawn, and shown illustratively in FIG. 9. In this figure, which is merely for purpose of illustration, the flange is also 0.048" in thickness. The length of the flange $l_s$ without thinning is l at $t_f$, whereas, at its reduced thickness $t_r$ the flange 1 at $t_r$ is reduced in thickness from $t_f$ to $t_r$, and is elongated to l at $t_r$. l at $t_r$ is shown in FIG. 10. l exceeds 1 at $T_f$ by approximately 20%–30%. The thickness of the axial flange part of the blanks $t_b$ during this process is reduced by approximately 20% to 30% and the length is extended, for example, by 20%–30%. Thus, the thickness has been reduced from 0.048" to 0.036" for example. The depth of the grooves is not materially altered by this drawing process, but if the grooves prove too shallow, they can simply be made slightly deeper initially. If they are spaced farther apart by the drawing process, the coined grooves may be simply placed closer together initially.

Referring now to FIG. 6, there is shown a plurality of the blanks generally designated 52 merely to illustrate one mass production approach to making the sleeve. In FIG. 6, these sections are attached to a pair of carrier strips 64 with very thin points of attachment 66 to the carrier strip 64.

Placing of the grooves in the blanks may be done before or after the blanks are separated from the carrier strip 64.

The method has been recited wherein the grooves in the wear sleeve are imparted by coining or stamping. This is the most convenient and, especially when used with the stamping or drawing process used to form the axial flange of the sleeve, it is preferred. However, if for some reason, another method were to be used, it would still fall within the spirit of the invention, which includes forming the grooves while the blank is in a flat condition and thereafter bending the inner margin of the blank into an axial flange while keeping the grooves relatively in position.

Likewise, the simplest method for forming the grooves has been merely to offset a circular pattern of grooves from the center of the blank, and allowing the sinuous hydrodynamic pattern thus formed to function. If, however it were decided to impart a somewhat sinuous pattern of coining or stamping before it was imparted to the sleeve, this could also fall within the scope of the invention. The advantage of making a circular pattern is that of simplicity, although it would be possible to impart a hydrodynamic pattern on the coining die, if this were desired for any reason.

The frustoconical form of PTFE member is shown as being preferred, however, it is not strictly necessary that such shape be used. The art is replete with seals in which the Teflon member is made from a strictly flat sheet and formed into a bell-mouthed configuration in different ways. It is also within the scope of the invention to have the washer form partly bell-mouthed or fully bell-mouthed, depending on the way in which it is post formed or cut from a billet. The preferred form of invention has been disclosed.

It will thus be seen that the present invention provides a novel seal and method having a number of advantages and characteristics including those expressly pointed out herein, and others which are inherent in the invention. An illustrative embodiment of the product of the invention having been shown and described, it is anticipated that variations to the described form of apparatus will occur to those skilled in the art and that such modifications and changes may be made without departing from the spirit of the invention, or the scope of the appended claims.

What is claimed is:

1. A wear sleeve for association with the active face of an associated seal unit to form a seal having a hydrodynamic action, said wear sleeve including an axial flange and a radial flange, the inside diameter of said axial flange being adapted for mounting relative to a shaft, and the radially outwardly facing surface of said axial flange having a plurality of grooves therein, said grooves being formed on an inner margin of a blank while said blank from which said wear sleeve is formed is in a flat condition, and folding said flat blank within a forming die so as to create an axially extending skirt thereon the inner surface of skirt forming die being free from all formations creating interference with said skirt, said grooves also being closely spaced axially apart from each other and forming a sinusoidal pattern on said wear sleeve, whereby a pumping action will result therefrom when there is relative motion between said wear sleeve and said active face.

2. A wear sleeve as defined in claim 1, wherein said active face of said associated seal unit is a relatively flat surface portion of a bell-mouthed ring of a hard, lubricous plastic material.

3. A wear sleeve as defined in claim 1, wherein said plurality of grooves are circular grooves formed by stamping or coining in said blank.

4. A wear sleeve as defined in claim 1, wherein said grooves are from about 0.002 inches to about 0.006 inches deep.

5. A wear sleeve as defined in claim 1, wherein said grooves are about 0.004 inches deep.

6. A wear sleeve as defined in claim 1, wherein said grooves are spaced axially apart from each other from about 0.04 inches to about 0.07 inches.

7. A wear sleeve as defined in claim 1, wherein said grooves are spaced from each other about 0.050 inches to about 0.065 inches.

8. A wear sleeve as defined in claim 1, wherein said grooves are in the form of a circle whose center is offset from the center of the wear sleeve blank, thereby forming said sinusoidal pattern on said wear sleeve blank.

9. A wear sleeve as defined in claim 1, wherein said axial flange is of a reduced thickness compared to said radial flange.

10. A wear sleeve as defined in claim 1 wherein said active face is on an associated seal unit made from PTFE.

11. A wear sleeve as defined in claim 1 wherein said active face is on an associated seal unit made from PTFE filled with carbon black and glass fibers.

12. A method of making a wear sleeve comprising forming a flat blank from a thin sheet of a hard, stiff material having a circular outer diameter and a spaced apart concentric circular inner diameter, with said flat blank including an inner margin, forming a plurality of grooves in said inner margin, said grooves being in a pattern comprising a plurality of concentric formations having diameters slightly different from each other, with said center of said plurality of grooves being slightly offset from the center of said flat blank, and bending at least the inner marginal portion of said flat blank such that it forms an axial flange containing said plurality of grooves on the outer diameter of said axial flange, said grooves forming a sinusoidal hydrodynamic pattern in said axial flange.

13. A method of making a wear sleeve as defined in claim 12, wherein said material is selected from the class consisting of steel, aluminum and brass.

14. A method of making a wear sleeve as defined in claim 12, wherein said plurality of grooves are circular grooves formed by stamping or coining.

15. A method of making a wear sleeve as defined in claim 12, wherein said grooves in the form of concentric circles spaced apart from each other, about 0.04 inches to about 0.07 inches.

16. A method of making a wear sleeve as defined in claim 12, wherein said concentric circles are offset from the center of said blanks by a total of about 0.020 inches to about 0.050 inches, measured on diameters.

17. A method of making a wear sleeve as defined in claim 12, wherein said grooves have a depth of about 0.002 inches to about 0.006 inches.

18. A method of making a wear sleeve as defined in claim 12, wherein said depth of said grooves is about 0.004 inches.

19. A method of making a wear sleeve as defined in claim 12, wherein said total offset between said grooves and said diameter of said blank is about 0.03 inches.

20. A method of making a wear sleeve as defined in claim 12, wherein said step of bending said inner marginal portion of said blank into an axial flange comprises drawing said blank into a reduced thickness, and thereby slightly elongating said flange and thereby spacing said grooves slightly farther apart.

21. A method of making a wear sleeve having hydrodynamic properties when associated with a seal member engaging said wear sleeve, said method comprising forming a metal blank having a circular outside diameter and a circular inner diameter, said diameters being concentric with respect to each other, forming a plurality of substantially concentric, closely spaced apart grooves in one surface of the inner margin of said blank, all of said grooves being larger than said inner diameter, and having the centers of said grooves offset slightly with respect to the geometric center of said blank, gripping the outer margin of said blank to secure the same against movement, and forming an axial skirt portion on said blank having a substantial axial extent and having said preformed grooves in the outer diameter portion of said skirt, and thereafter inserting the wear sleeve thus formed over a shaft and associating said sleeve with a sealing unit which includes a seal having a contact member biased into radial engagement with said outer diameter of said axial flange of said wear sleeve.

22. A method of making a wear sleeve as defined in claim 21, wherein forming said skirt includes the step of drawing said skirt to a reduced thickness in relation to said radial flange.

23. A method of making a wear sleeve as defined in claim 21, wherein said grooves are in a circular pattern in said inner margin.

24. A method as defined in claim 21, wherein said contact member is made from PTFE.

25. A method as defined in claim 21, wherein said contact member is made from PTFE filled with carbon black and a glass fiber material.

* * * * *

UNITED STATES PATENT AND TRADEMARK OFFICE
CERTIFICATE OF CORRECTION

PATENT NO.    : 6,354,598 B1
DATED         : March 12, 2002
INVENTOR(S)   : Kuang-Yu Huang It is certified that error appears in the above-identified patent and that said Letters Patent is hereby corrected as shown below:

<u>Column 5,</u>
Line 1, delete "$l_s$"
Line 3, delete "."
Line 4, after "$t_r$" and before "l", insert -- . --
Line 5, delete "$T_f$" and insert -- $t_f$ --

<u>Column 6,</u>
Line 6, after "of" and before "skirt", insert -- said --

Signed and Sealed this

Twenty-fourth Day of September, 2002

Attest:

JAMES E. ROGAN
Attesting Officer     Director of the United States Patent and Trademark Office